(12) United States Patent
Ebeshu

(10) Patent No.: US 7,707,333 B2
(45) Date of Patent: Apr. 27, 2010

(54) DATA TRANSFERRING DEVICE FOR TRANSFERRING DATA SENT FROM ONE COMMUNICATION DEVICE TO ANOTHER COMMUNICATION DEVICE

(75) Inventor: Hidetaka Ebeshu, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 483 days.

(21) Appl. No.: 11/047,744

(22) Filed: Feb. 2, 2005

(65) Prior Publication Data

US 2006/0069817 A1 Mar. 30, 2006

(30) Foreign Application Priority Data

Sep. 29, 2004 (JP) ............................. 2004-284571

(51) Int. Cl.
G06F 3/00 (2006.01)
G06F 5/00 (2006.01)
(52) U.S. Cl. .............................. 710/52; 710/12; 710/16; 710/31; 370/357; 370/360; 370/362; 370/364
(58) Field of Classification Search .................. 710/12, 710/16, 31, 52; 370/357, 360, 362, 364
See application file for complete search history.

(56) References Cited

U.S. PATENT DOCUMENTS

| 4,866,609 | A | * | 9/1989 | Calta et al. ..................... 710/54 |
| 5,859,718 | A | | 1/1999 | Yamamoto et al. ............. 398/51 |
| 5,958,021 | A | * | 9/1999 | Tsuchiyama et al. .......... 710/12 |
| 6,014,716 | A | * | 1/2000 | Ohara ........................... 710/14 |
| 6,345,317 | B1 | * | 2/2002 | Takeda ........................... 710/2 |
| 6,381,666 | B1 | * | 4/2002 | Kejser et al. ................. 710/300 |
| 6,513,105 | B1 | * | 1/2003 | Pontius ......................... 711/209 |
| 6,781,984 | B1 | * | 8/2004 | Adam et al. .................. 370/360 |
| 6,996,636 | B2 | * | 2/2006 | Hung et al. ...................... 710/8 |
| 7,085,861 | B2 | * | 8/2006 | Chiang et al. ................ 710/38 |
| 7,401,162 | B2 | * | 7/2008 | Baker et al. ..................... 710/8 |
| 2002/0059479 | A1 | * | 5/2002 | Hardy et al. .................... 710/1 |
| 2003/0154331 | A1 | * | 8/2003 | Bader et al. ................... 710/12 |
| 2003/0156639 | A1 | * | 8/2003 | Liang ..................... 375/240.01 |
| 2004/0013124 | A1 | * | 1/2004 | Peebles et al. .............. 370/412 |
| 2004/0153597 | A1 | * | 8/2004 | Kanai et al. ................. 710/305 |

(Continued)

FOREIGN PATENT DOCUMENTS

JP 2-50721 2/1990

(Continued)

OTHER PUBLICATIONS

'Classification Categories and Historical Development of Circuit Switching Topologies' by George Broomell and J. Robert Heath. Published in ACM Computing Surveys in Jun. 1983 by the ACM Press.*

(Continued)

Primary Examiner—Henry W. H. Tsai
Assistant Examiner—Steven G Snyder
(74) Attorney, Agent, or Firm—Staas & Halsey LLP

(57) ABSTRACT

Upon reception of data via a first communication device, a unit connects the first communication device with a storage unit to store the data to be transferred and, after completion of data reception, the unit switches connections of the storage unit to a second communication device and transmits the stored data to the second communication device.

8 Claims, 13 Drawing Sheets

U.S. PATENT DOCUMENTS

2004/0236873 A1* 11/2004 Kasame et al. .................. 710/1
2005/0177657 A1* 8/2005 Pope et al. .................... 710/36
2006/0018329 A1* 1/2006 Nielsen et al. .............. 370/401
2007/0239919 A1* 10/2007 Kanai et al. ................. 710/305

FOREIGN PATENT DOCUMENTS

| JP | 02050721 A | * | 2/1990 |
| JP | 09-224052 | | 8/1997 |
| JP | 11085462 A | * | 3/1999 |

OTHER PUBLICATIONS

Japanese Office Action Notice of Rejection Grounds in the corresponding Japanese Patent Application No. 2004-284571, dated Jan. 19, 2010 (2 pages), English Translation (2 pages).

* cited by examiner

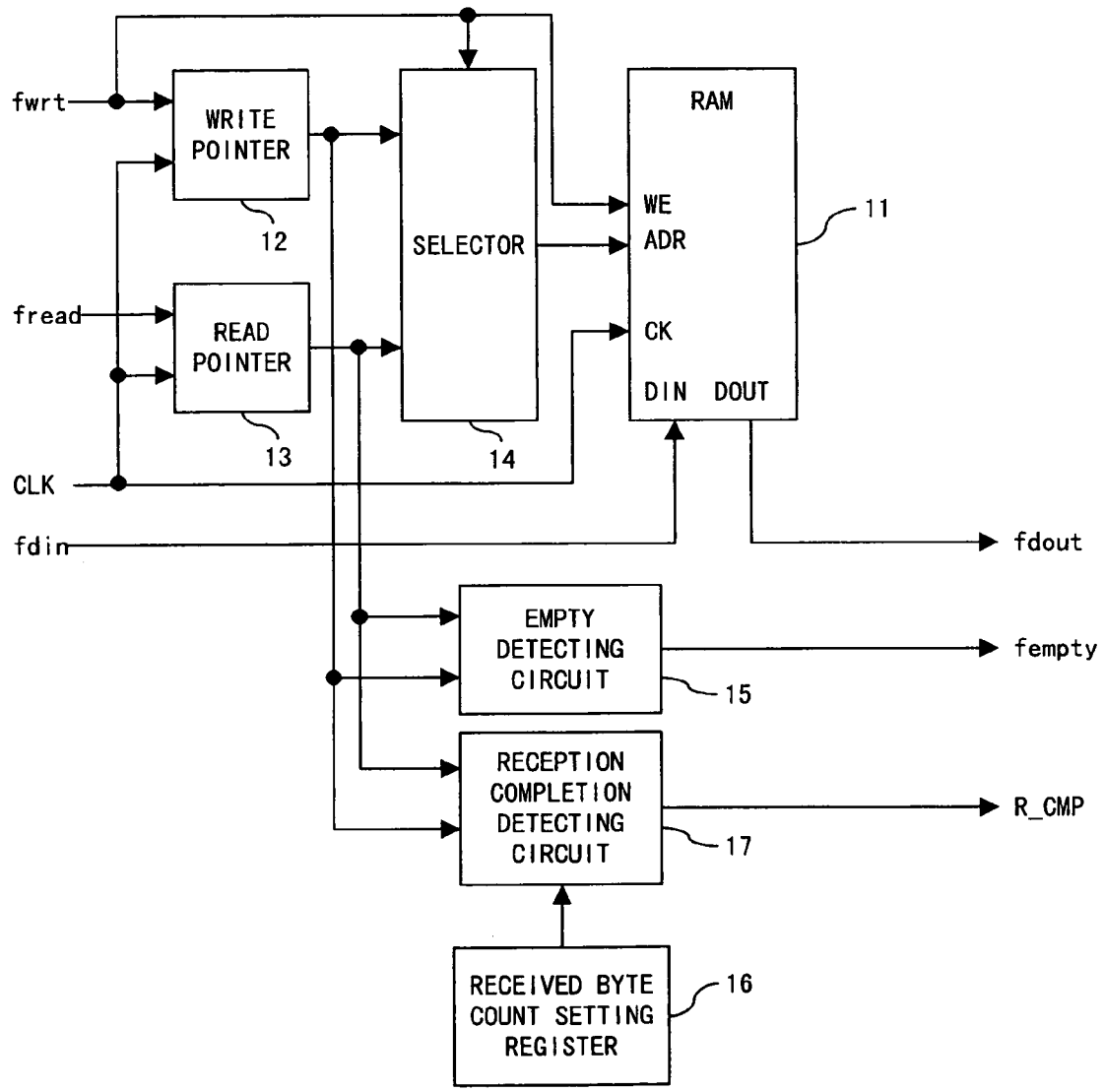
F I G. 2

| SEL | FIFO21 | FIFO22 |
|---|---|---|
| 0 | USED AS TRANSMITTING FIFO MEMORY AND CONNECTED TO COMMUNICATION DEVICE B | USED AS RECEIVING FIFO MEMORY AND CONNECTED TO COMMUNICATION DEVICE B |
| 1 | USED AS RECEIVING FIFO MEMORY AND CONNECTED TO COMMUNICATION DEVICE A | USED AS TRANSMITTING FIFO MEMORY AND CONNECTED TO COMMUNICATION DEVICE A |

FIG. 4

| SEL[1:0] | FIFO21 | FIFO22 |
|---|---|---|
| 00 | USED AS TRANSMITTING FIFO MEMORY AND CONNECTED TO COMMUNICATION DEVICE A | USED AS RECEIVING FIFO MEMORY AND CONNECTED TO COMMUNICATION DEVICE B |
| 01 | USED AS TRANSMITTING FIFO MEMORY AND CONNECTED TO COMMUNICATION DEVICE B | USED AS RECEIVING FIFO MEMORY AND CONNECTED TO COMMUNICATION DEVICE A |
| 10 | USED AS RECEIVING FIFO MEMORY AND CONNECTED TO COMMUNICATION DEVICE A | USED AS TRANSMITTING FIFO MEMORY AND CONNECTED TO COMMUNICATION DEVICE B |
| 11 | USED AS RECEIVING FIFO MEMORY AND CONNECTED TO COMMUNICATION DEVICE B | USED AS TRANSMITTING FIFO MEMORY AND CONNECTED TO COMMUNICATION DEVICE A |

F I G. 7

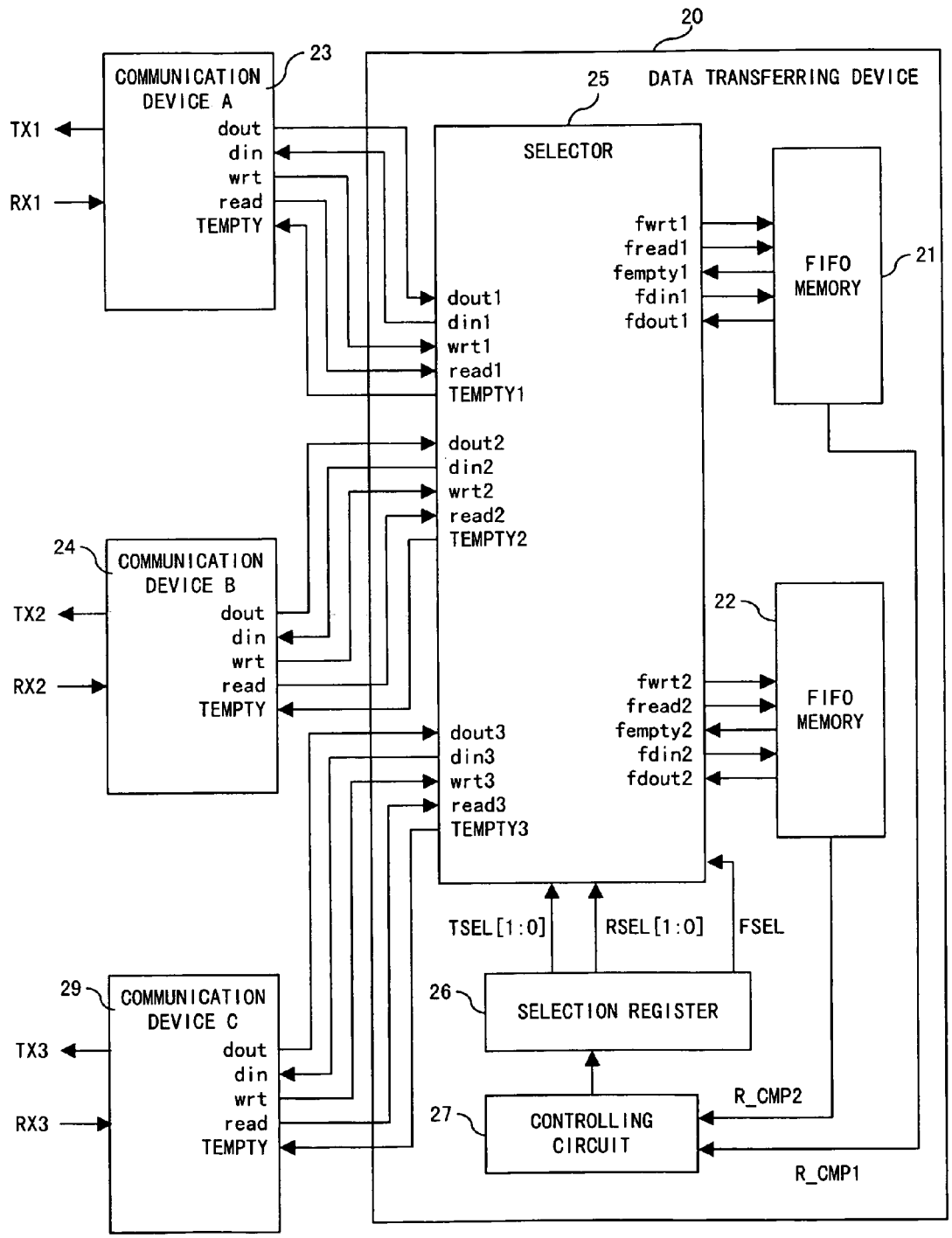
F I G. 9

| FSEL | FIFO21 | FIFO22 |
|---|---|---|
| 0 | RECEIVING FIFO MEMORY | TRANSMITTING FIFO MEMORY |
| 1 | TRANSMITTING FIFO MEMORY | RECEIVING FIFO MEMORY |

FIG. 10

| RSEL, TSEL | 00 | 01 | 10 |
|---|---|---|---|
| TRANSMITTING FIFO MEMORY | COMMUNICATION DEVICE A | COMMUNICATION DEVICE B | COMMUNICATION DEVICE C |
| RECEIVING FIFO MEMORY | COMMUNICATION DEVICE A | COMMUNICATION DEVICE B | COMMUNICATION DEVICE C |

F I G. 1 1

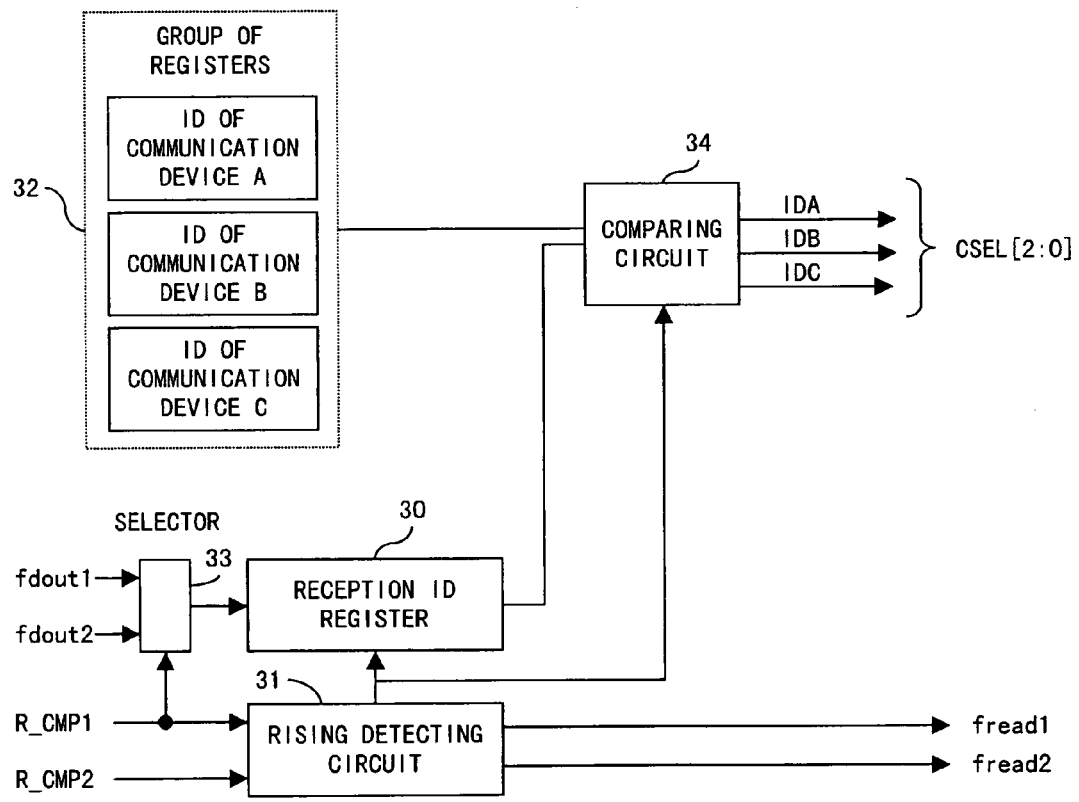
F I G. 1 3

DATA TRANSFERRING DEVICE FOR TRANSFERRING DATA SENT FROM ONE COMMUNICATION DEVICE TO ANOTHER COMMUNICATION DEVICE

CROSS-REFERENCE TO RELATED APPLICATIONS

This application is based upon and claims the benefit of priority from the prior Japanese Patent Application No. 2004-284571, filed in Sep. 29, 2004, the entire contents of which are incorporated herein by reference.

BACKGROUND OF THE INVENTION

1. Field of the Invention

The present invention relates to a data transferring method in which data received from the outside via a communication device is transmitted to the outside by using another communication device, and more particularly to a data transferring device in which data received by one communication device and stored in a memory is directly transmitted to the outside by connecting the memory to another communication device without storing the received data in another storage device.

2. Description of the Related Art

In a conventional data transferring device, data received from the outside via a communication device is stored in, for example, a FIFO memory (First In First Out memory) and is once transferred to a storage device such as a hard disk or the like under a control of a CPU or a DMA controller, thereafter, the data is transferred to a FIFO memory for data transmission from the storage device in order to be transmitted to the outside using a communication device.

As a conventional art, Japanese Patent Application No. 2-50721 "Double buffer circuit" discloses a technique for absorbing a gap of data transmission speed for data transmission and receiving in such data transferring process as above by conducting a switching process between a FIFO memory for transmission and a FIFO memory for receiving in case that there is a data transmission gap between data receiving and data transmitting from/to the outside. However there is a problem that a complicated control is required in order to conduct a switching process between a FIFO memory for data transmitting and a FIFO memory for data receiving. Further, in case that received data is once stored in a storage device such as a hard disk as described above, there is a problem that redundant processes are conducted such as data transferring from a FIFO memory for data receiving to a storage device, and data transferring from the FIFO memory for data receiving to a FIFO memory for data transmitting.

SUMMARY OF THE INVENTION

It is an object of the present invention to provide a configuration that redundant processes are made unnecessary and further, a control of the data transferring is simplified by causing one FIFO memory to serve both as a FIFO memory for data receiving and as a FIFO memory for data transmitting thereby omitting data transferring processes with a storage device such as a hard disk or the like in a data transferring device.

A feature of the present invention resides in a device for transferring data by using two communication devices, comprising a data storing unit for storing data to be transferred and a connection switching unit for, upon reception of data via one communication device, connecting the one communication device with the data storing unit, and for conducting switching of connections of the data storing unit to the other communication device for transmitting the stored data after the reception of data is completed.

According to the present invention, it is possible to simplify a control of data transferring and to omit redundant processes such as transferring of data from a FIFO memory to a storage device such as a hard disk or the like by causing one FIFO memory to serve both as a FIFO memory for data receiving and as a FIFO memory for data transmitting.

BRIEF DESCRIPTION OF THE DRAWINGS

The present invention will be more apparent from the following detailed description in conjunction with the accompanying drawings, in which:

FIG. 2 is a block diagram of an example of a configuration of a First In First Out (FIFO) memory according to an embodiment of the present invention;

FIG. 4 is a table for explaining a relationship between SEL signals and use conditions/connection conditions of FIFO memories;

FIG. 7 is a table for explaining a relationship between selection signal, SEL and use conditions/connection conditions of FIFO memories;

FIG. 9 is a block diagram showing a configuration of an embodiment 4 of the data transferring device according to the present invention;

FIG. 10 is a table for explaining a relationship between the control signal, FSEL and the use conditions of FIFO memories in the embodiment 4;

FIG. 11 is a table for explaining a relationship between connection conditions of communication devices and a selector, and control signals, TSEL and RSEL in the embodiment 4;

FIG. 13 is a block diagram for showing a configuration of a controlling circuit in the embodiment 5.

DESCRIPTION OF THE PREFERRED EMBODIMENTS

Figure 1:
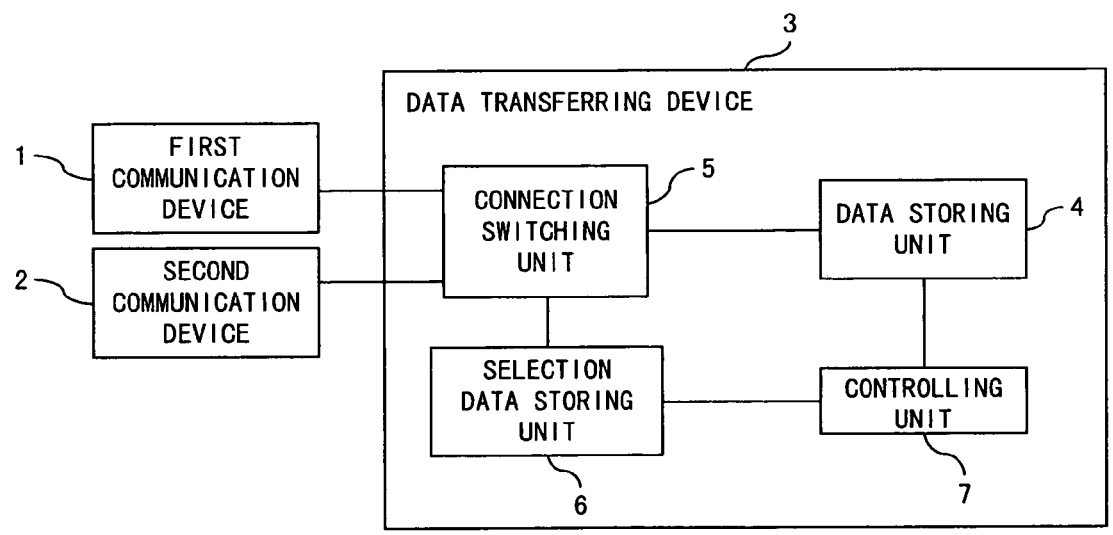
FIG. 1 is a block diagram showing a principle configuration of a data transferring device according to the present invention.

FIG. 1 is a block diagram showing a principle configuration of a data transferring device according to the present invention. FIG. 1 shows a data transferring device 3 comprising, for example, two communication devices, i.e. a first communication device 1 and a second communication device 2 respectively for receiving data and transmitting the data which is received via the first communication device.

The data transferring device 3 of the present invention comprises at least a data storing unit 4 and a connection switching unit 5. The data storing unit 4 stores data to be transferred. The connection switching unit 5 connects, upon receiving data via one communication device such as the first communication device 1, the communication device 1 with the data storing unit 4 and switches, after the completion of receipt of the above data, the connection to a communication device for transmitting the data stored in the data storing unit 4, i.e. the second communication device 2.

When the present invention is embodied, the data storing unit 4 can comprise a FIFO (First In First Out) memory.

Also, when the present invention is embodied, the data transferring device 3 can further comprise a selection data storing unit 6 for storing selection data to be used for a selection of a communication device to transmit data whose reception is completed and for supplying the data to the connection switching unit 5. Further, the data transferring device 3 can comprise a controlling unit 7 for determining a communication device to transmit data based on a received data, corresponding to a data reception completion signal output from the data storing unit 4, and for setting data in the selection data storing unit 6 which data is to be used for selection of a communication device.

In the above case, there can be a configuration that the data storing unit 4 comprises a FIFO memory as described above, and an identifier is stored as leading data in the received data which identifier indicates a communication device to be connected after the switching of the connections by the connection switching unit 5, and the controlling unit 7 reads the leading data in the received data in order to determine a communication device to transmit the data, corresponding to the stored identifier.

Further, when the present invention is embodied, the data transferring device 3 can comprises a switching prohibiting unit for prohibiting the switching regarding a data storing unit and a communication device by the connection switching unit 5 after the data reception via the first communication device 1 is completed, for example.

Still further, the data transferring device according to the present invention conducts data transferring processes with a plurality of communication devices and comprises at least a plurality of data storing units and a connection switching unit. Each of the plurality of data storing units stores data to be transferred. And the connection switching unit connects, upon reception of data via one of the plurality of communication devices, the one communication device with one of the plurality of data storing units, and connects, after the reception of the above data is completed, the above one data storing unit with a communication device to transmit data stored in the storing unit.

When the present invention is embodied, the data transferring device can further comprise a controlling unit for detecting a completion of storage of the received data in the above one data storing unit, and for causing the connection switching unit to conduct switching of connections regarding the data storing units and the communication devices.

FIG. 2 is a block diagram showing an example of a configuration of a FIFO memory in the present embodiment. In FIG. 2, the FIFO memory comprises a RAM (Random Access Memory) for storing data, a write pointer for supplying a write address for the RAM 11, a read pointer 13 for supplying a read address for the RAM 11, a selector 14 for connecting the write pointer 12 or the read pointer 13 with an address terminal of the RAM 11, an empty detecting circuit 15 for comparing pointer values between the write pointer 12 and the read pointer 13, and detecting that there is no data in the RAM 11 when the difference of the pointers between the write pointer 12 and the read pointer 13 is zero, a received byte count setting register 16 in which the byte count of data to be received upon the data reception, and a reception completion detecting circuit 17 for detecting reception completion of data when a difference of pointer values between the write pointer 12 and the read pointer 13 is equal to a byte count of the received data which byte count is set in the register 16. Also, the RAM 11 is empty when the first data starts to be received, for example.

In FIG. 2, when data is received from the outside via a communication device, fwrt signal is set as "1"and a pointer value of the write pointer 12 is supplied to the address terminal (ADR) of the RAM 11. Also, the fwrt signal is supplied to a write enable terminal (WE) at the same time. The received data is supplied, as fdin signal to data input terminal (DIN) of the RAM 11 and the received data is written in an area with an address output by the selector 14 by a rising of a clock signal (CLK). Further, simultaneously therewith, a pointer value of the write pointer 12 is incremented by a rising of a clock signal (CLK). The above processes are repeated until a byte count which is set in the reception byte count setting register 16 beforehand as described above and a difference of pointer values between the write pointer 12 and the read pointer 13 become equal to each other.

When data is read out, fread signal is set as "1", and the selector 14 is switched to the read pointer 13. A pointer value of the read pointer 13 is supplied to an address terminal of the RAM 11 and data is output, as fdout signal from a data output terminal (DOUT) of the RAM 11 by a rising of a clock signal (CLK). Simultaneously therewith, a pointer value of the read pointer 13 is incremented. The above processes are repeated until pointer values of the write pointer 12 and the read pointer 13 become equal to each other, i.e. until all of the data stored in the RAM are read out.

Figure 3:
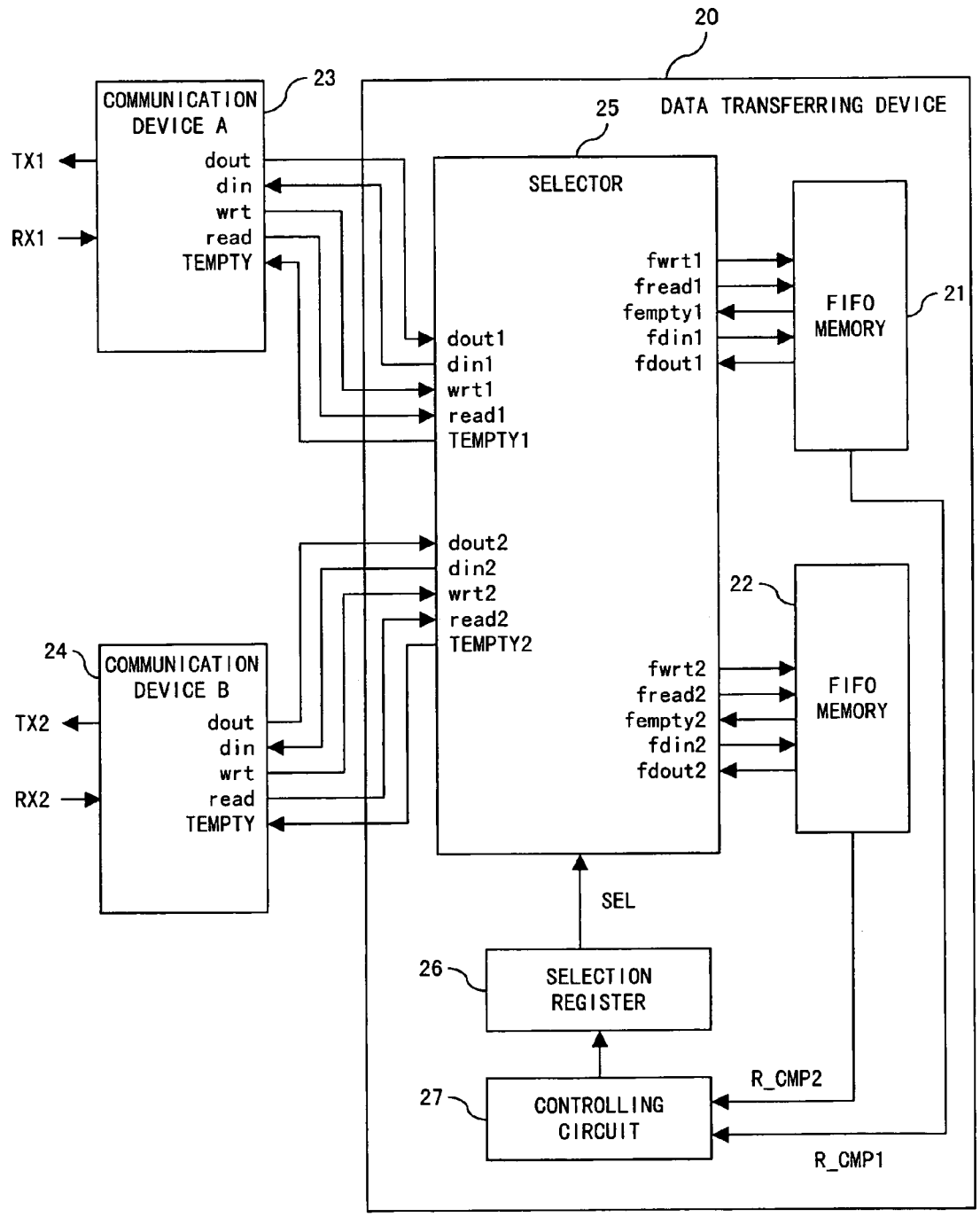
FIG. 3 is a block diagram showing a configuration of an embodiment 1 of the data transferring device according to the present invention.

FIG. 3 is block diagram showing a configuration of an embodiment 1 of the data transferring device according to the present invention. In FIG. 3, the data transferring device 20 comprises two FIFO memories i.e. a FIFO memory 21 and a FIFO memory 22 in which the FIFO memories data to be received via communication devices A23 and B24 or data to be transmitted via these communication devices A23 and B24 is stored.

The data transferring device 20 further comprises a selector 25, a selection register 26 and a controlling circuit 27. The selector 25 conducts connection switching between the side of the two FIFO memories (FIFO memories 21 and 22) and the side of the two communication devices (communication devices 23 and 24). The selection register 26 supplies to a selector 25 a selection signal SEL for controlling the connection switching conducted by the selector 25. The controlling circuit 27 sets a value of the selection signal SEL in the selection register 26, corresponding to an input of data reception completion signals each output by the two FIFO memories 21 and 22, i.e. R_CMP signals output by the reception completion detection circuit 17 of FIG. 2.

Also, data storing unit in claims 1 and 7 of the present invention corresponds to FIFO memories, connection switching unit in the claims 1 and 7 corresponds to the selector 25, selection data storing unit in claim 3 corresponds to the selection register 26 and controlling unit in claims 4 and 8 corresponds to the controlling circuit 27.

In FIG. 3, when, for example, data received via the communication device A23 is to be stored in the FIFO memory 21, wrt 1 is connected to fwrt 1 and dout 1 is connected to fdin 1 by the selector 25. Further, when, for example, data stored in the FIFO memory 22 is to be transmitted to the outside via the communication device B24, fdout 2 is connected to din 2 and fempty 2 is connected to TEMPTY 2.

FIG. 4 is a table for explaining a relationship of the connection conditions between SEL signals set in the selection register 26 of FIG. 3 and the two FIFO memories. In the present embodiment 1, the SEL signal is a signal in one bit and when the value of the SEL signal is "1", the FIFO memory 21 is connected to the communication device A23 as a data receiving FIFO memory, while the FIFO memory 22 is connected to the communication device A as a data transmitting FIFO memory. To the contrary, when the value of the SEL signal is "0", the FIFO memory 21 is connected to the communication device B24 as a transmitting FIFO memory, while the FIFO memory 22 is connected to the communication device B as a receiving FIFO memory.

When, for example, the SEL signal is "1", a reception serial signal RX 1 is supplied to the selector 25 as received data dout by the communication device A23, and the above received and supplied data is written in FIFO memory 21 as fdin 1. This writing process is conducted by being supplied with write signal wrt from the communication device A23 and by the connection between wrt 1 and frt 1. Then, the pointer value of the write pointer 12 of FIG. 2 is incremented for each writing process of data of 1 byte, for example. As described above, a difference of the pointer values between the write pointer 12 and the read pointer 13 becomes equal to a byte count of the received data set in the reception byte count setting register 16, the reception completion signal R_CMP is output from the reception completion detecting circuit 17. Specifically, in FIG. 3, the reception completion signal R_CMP 1 is output from the FIFO memory 21 to the controlling circuit 27.

Thereby, the controlling circuit 27 outputs "0" as a SEL signal to the selection register 26 for conducting connection switching of selector, and FIFO memory 21 is connected to the communication device B24 as a transmitting FIFO memory. Then, fempty 1 output from the FIFO memory 21 is supplied to the communication device B24 as TEMPTY by the selector 25, and the value of the TEMPTY is "0" indicating that there is data in FIFO memory 21.

As for the communication device B24, a read signal is set as "1" for transmitting data, and the read signal is supplied to the FIFO memory 21 as a fread 1 signal by the register 25 so that the read out process of data is started. The data which has been readout is supplied to din to the communication device B24 from fdout 1 via a selector 25 in order to be output to the outside as a transmission serial signal TX2. The processes are repeated until a fempty 1 signal from the FIFO memory 21 becomes "1" and is supplied as a TEMPTY signal to the communication device B24.

When the selection signal SEL of FIG. 4 is originally "0", the completely same process are conducted, specifically, data received via the communication device B24 is stored in the FIFO memory 22, and when the reception completion signal R_CMP 2 signal becomes "1", the selection signal SEL is switched into "1", and the FIFO memory 22 is connected to the communication device A23 as the transmitting FIFO memory. Thereafter, data stored in the FIFO memory 22 is transmitted to the outside via the communication device A23.

Figure 5:
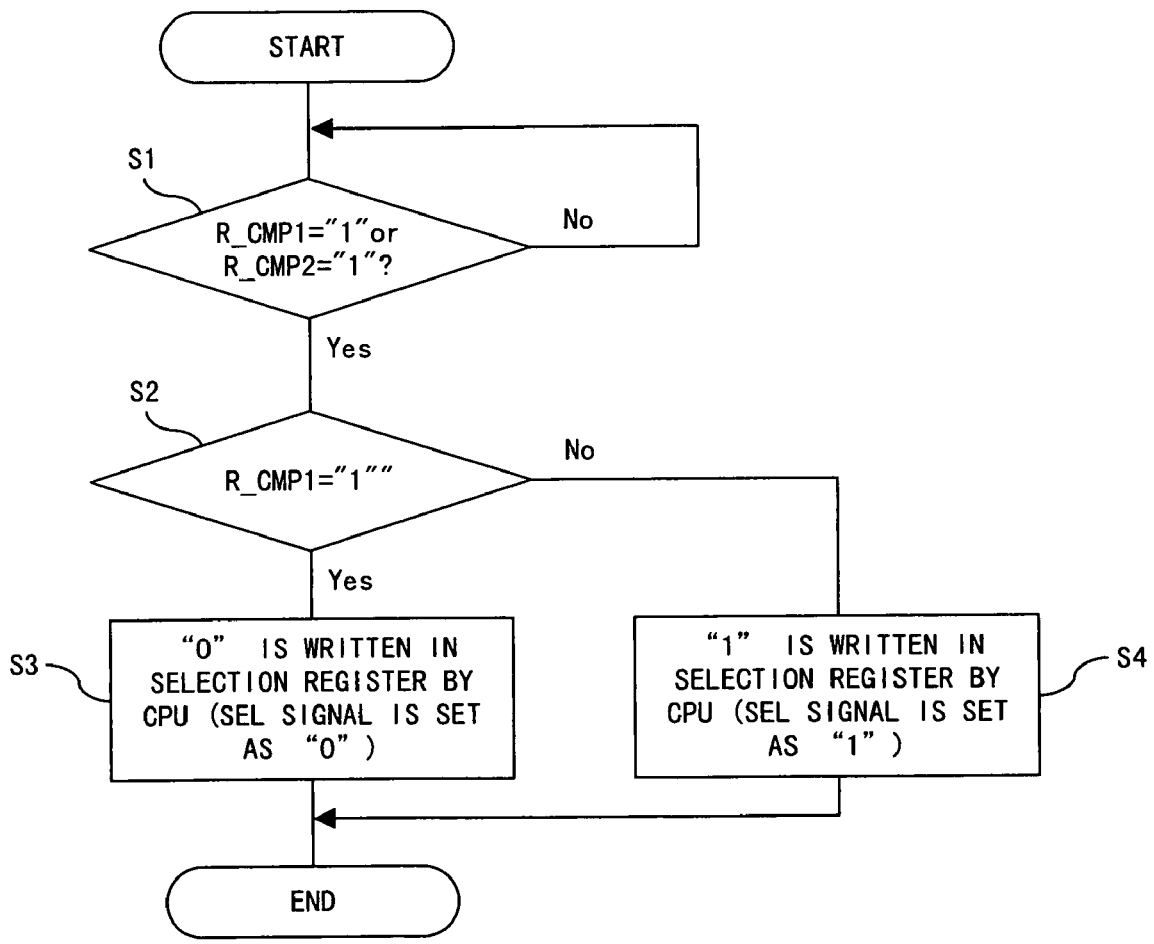
FIG. 5 is a flowchart of a control process of connection switching of a selector in the embodiment 1.

FIG. 5 is a flowchart of selection signal switching process by the controlling circuit 27 in the embodiment 1. In the embodiment 1, the controlling circuit consists basically of a CPU in order to execute process of FIG. 5.

When processes are started in FIG. 5, firstly in step S1, it is determined whether or not any one of the two reception completion signals is input to the controlling circuit 27 of FIG. 3 as "1". If none of the two reception completion signals is input as "1", the above determination is repeated. If any one of the reception signals is input as "1", it is determined whether or not R_CMP 1 i.e. the reception completion signal from the FIFO memory 21 has become "1" in step S2. And if the R_CMP 1 has become "1", "0" is written in the selection register 26 as the SEL signal from the controlling circuit 27, i.e. the CPU actually in step S3. This is because it is when a SEL signal is "1" that FIFO memory 21 is set as a receiving FIFO memory in FIG. 4, and the FIFO memory 21 is connected to the communication device A23 at that time, and the FIFO memory 21 is set as a transmitting FIFO memory so that the SEL signal is set as "0" in order to be connected with the communication device B24.

When the R_CMP 1 signal is not "1" in step S2, it means that the R_CMP 2 signal output from the FIFO memory 22 of FIG. 3 has become "1", and in step S4, "1" is written as the selection signal SEL in the selection register 26 by the CPU. And a status in which the FIFO memory 22 is connected to the communication device B24 as the receiving FIFO memory is switched into a status in which the FIFO memory 22 is connected to the communication device A23 as the transmitting FIFO memory.

Figure 6:
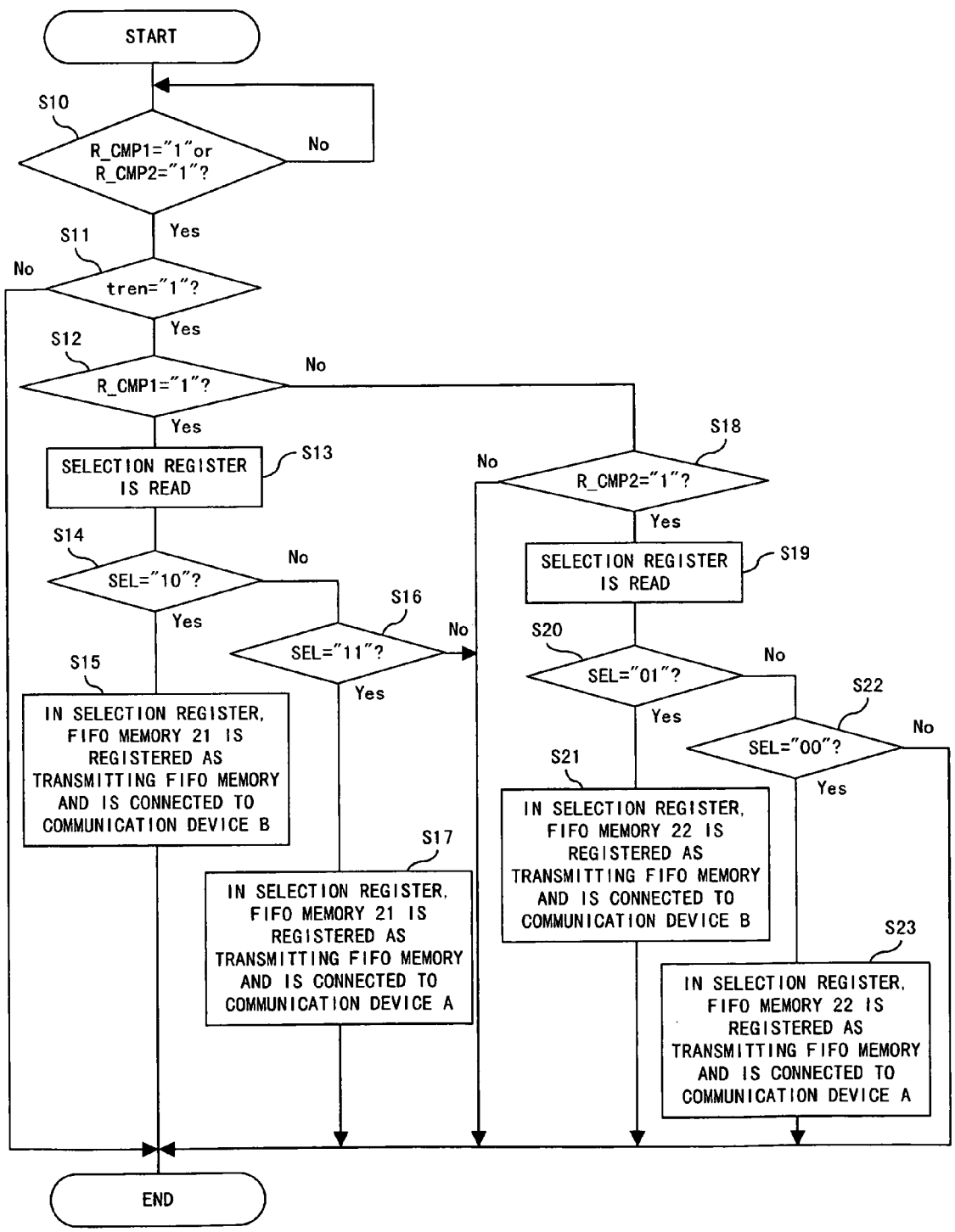
FIG. 6 is a flowchart of a control process of connection switching of a selector in the embodiment 2.

FIG. 6 is a flowchart of the connection switching processes of the selector by the controlling circuit in an embodiment 2 of the data transferring device of the present invention. As described in FIG. 4, in the embodiment 1, the SEL signal supplied to the selection register 26 is a signal in one bit, however, in the embodiment 2, a control of switching of the selector is conducted with the SEL signal which is a signal in two bits.

FIG. 7 is a table for explaining a relationship of the connection conditions between the above selection signals, SEL and the two FIFO memories. In FIG. 4 corresponding to the embodiment 1, the FIFO memory 21 is used just as a receiving FIFO memory when the FIFO memory 21 is connected to the communication device A, for example, however, in FIG. 7 corresponding to the embodiment 2, even if the FIFO memory 21 is set as a transmitting FIFO memory being connected to the communication device A, the FIFO memory 21 can be used also as a receiving FIFO memory.

When processes of FIG. 6 are started, firstly in step S10, in the same manner as in step S1 of FIG. 5, it is determined whether or not any one of the reception completion signals from two FIFO memories has become "1". If any one of the signals has become "1", it is determined whether or not a FIFO memory switching permission bit, i.e. a value of tren bit (transfer enable bit) has become "1". The FIFO memory switching permission bit is not for transmitting the received and stored data, but for prohibiting a connection switching by the selector by setting the bit as "0" when, for example, data received via a communication device and stored in a FIFO memory is not to be transmitted to the outside but to be used for, for example, a calculation in the CPU. When the value of the switching permission bit is not "1" the connection switching processes are immediately ended. When a value of the FIFO memory switching permission bit is "1", a connection switching by the selector 25 between FIFO memories and communication devices is permitted, and in step S12, it is determined whether or not a reception completion signal from the FIFO memory 21 has become "1" in the same manner as in step S2 of FIG. 5. If the signal has become "1", contents in the selection register 26 are read in step S13.

Specifically, in the embodiment 1, when a reception completion signal is output from the FIFO memory 21, the FIFO memory 21 is connected to the communication device A as explained in FIG. 4 and it is obvious that the value of the SEL signal is "1". However, in the embodiment 2, it is necessary to acquire the value of SEL signal in two bit in order to determine to which of the communication device A or the communication device B, the FIFO memory is connected, also when the FIFO memory 21 is used as a receiving FIFO memory as in FIG. 7. For this purpose, in step S13, the contents of the selection register 26 are read and in step S14, it is determined whether or not a value of the selection signal SEL is "10", so that "01" is set as the SEL signal in the selection register 26 in step S15 when the value of the selection signal SEL is "10". Thereafter, processes are ended after a connection switching such as connecting the FIFO memory 21, as a transmitting FIFO memory, to the communication device B24.

In step S14, when it is determined that a value of SEL read out from the selection register 26 is not "10", it is determined whether or not the value of SEL is "11" in step S16. If the value of SEL is "11", the FIFO memory 21 is set as a transmitting FIFO memory in step S17, and processes are ended after a switching process such as connecting the FIFO memory 21 to the communication device A23 (i.e. setting the SEL as "00") Also, when it is determined that the value of SEL is not "11" in step S16, it is determined that some error has occurred so that the processes are immediately ended.

When it is determined that a reception completion signal from the FIFO memory 21 is not "1" in step S12, it is determined whether or not a reception completion signal from the FIFO memory 22 is "1" in step S18. If it is determined that the signal is not "1", it is determined that some error has occurred so that the processes are ended. If it is determined that the signal is "1", a connection switching processes between the FIFO memory 22 and the communication devices are conducted in steps S19 to S23, in the same manner as in steps S13 to S17.

Specifically, in step S19, contents of the selection register 26 are read and it is determined whether or not the value of the selection register 26 is "01" in step S20. If it is determined that the value is "01", the value of SEL is set as "10" so that the FIFO memory 22 is connected to the communication device B24 as a transmitting FIFO memory. Thereafter, the processes are ended.

When it is determined that the value of SEL is not "01" in step S22, it is determined whether or not the above value of SEL is "00" in step S22. If it is determined that the value is "00", the value is set as "11" so that the FIFO memory 22 is connected to the communication device A23 as a transmitting FIFO memory. Thereafter, the processes are ended. When it is determined that the value of SEL is not "00" it is determined that some error has occurred so that the processes are immediately ended.

Figure 8:
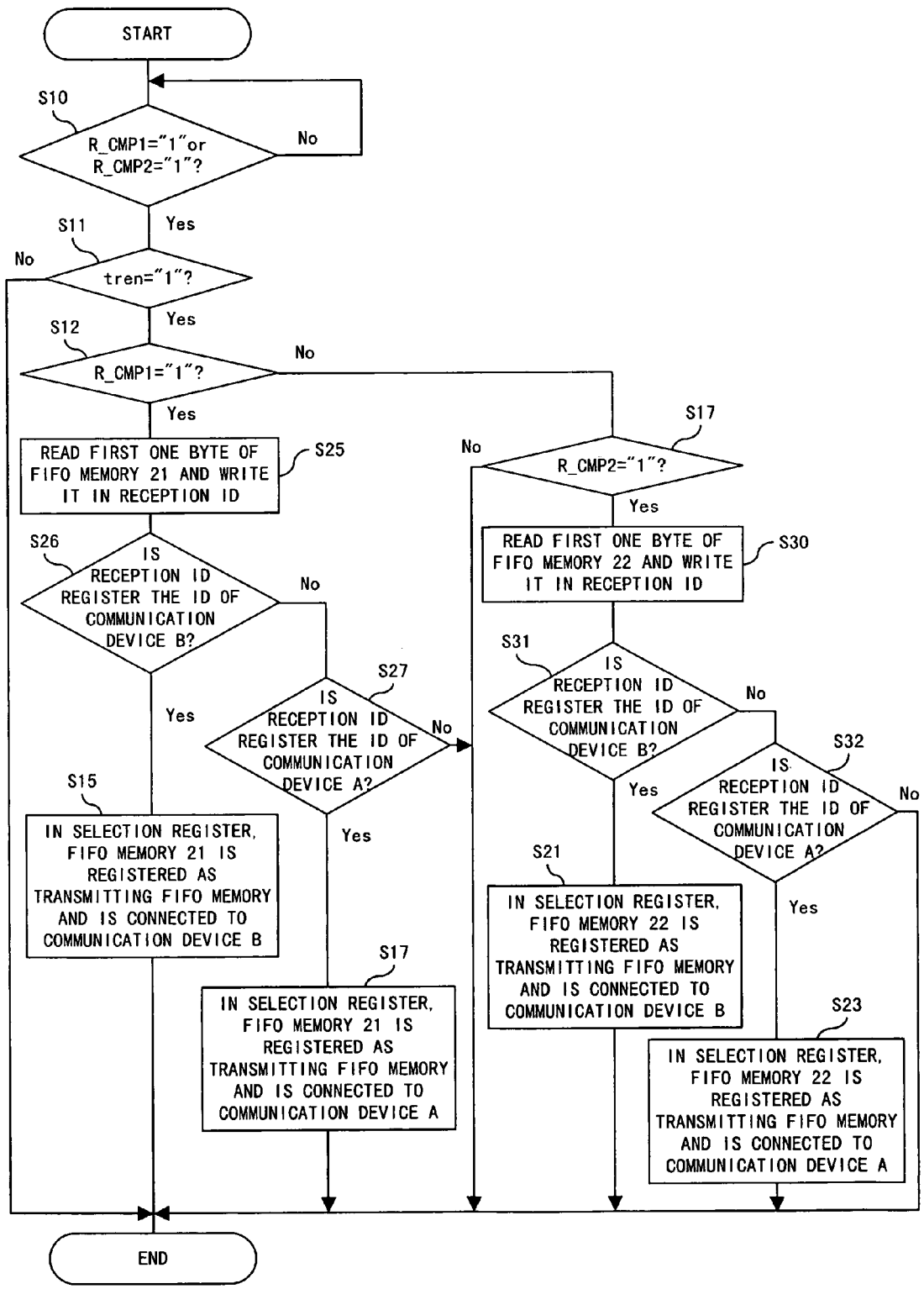
FIG. 8 is a flowchart of a control process of connection switching of a selector in an embodiment 3.

FIG. 8 is a flowchart of connection switching processes of the selector in the data transferring device as an embodiment 3 of the present invention. In the embodiment 3, a value of SEL signal is expressed as a signal in two bits similarly as in the embodiment 2. The meaning thereof is the same as in FIG. 7. However, a switching processes itself of the selector is conducted without reading a value of SEL signal stored in the selection register. Specifically, among data received via the communication devices from the outside, for example, data of one byte that is firstly received includes a reception ID as an identifier indicating which of the communication devices is to transmit that received data to the outside, and the connection switching processes are conducted by judging the content of the ID.

When processes are started in FIG. 8, firstly steps S10 to S12 are conducted in the same manner as in FIG. 6 corresponding to the embodiment 2. If it is determined that a reception completion signal from the FIFO memory 21 is "1" in step S12, data of one byte to be firstly output among data stored in the FIFO memory 21 is read in step S25 and the reception ID in the read one byte is written in the reception ID register which will be described later. And in step S26, it is determined whether or not a value of the above register is an identifier of the communication device B24 and if it is determined that the above value is the identifier of the communication device B24, the FIFO memory 21 is connected to the communication device B24 as a transmitting FIFO memory in step S15, as in FIG. 6. Thereafter, the processes are ended.

If it is determined that the content of the reception ID is not an identifier of the communication device B24 in step B26, it is determined whether or not the content of the reception ID register is an identifier of the communication device A23, and if it is determined that the content of the reception ID register is the identifier, the FIFO memory 21 is connected to the communication device A23 as a transmitting FIFO memory in step S17. Thereafter, the processes are ended. Also, the content of the reception ID register is not an identifier of the communication device A23 in step 27, it is determined that some error has occurred so that the processes are immediately ended.

When it is determined that the reception completion signal from the FIFO memory 21 is not "1" in step S12, it is determined whether or not the reception completion signal from the FIFO memory 22 is "1". If it is determined that the reception completion signal from the FIFO memory 22 is not "1", it is determined that some error has occurred so that the processes are immediately ended. If it is determined that the reception completion signal from the FIFO memory 22 is "1", processes are conducted in step S30 and the following steps, which processes are the same as in step S25 and following steps conducted in case that the reception completion signal from the FIFO memory 21 is "1".

Specifically, data of the first one byte that is stored in the FIFO memory 22 is read in step S30 and the reception ID is written in the register. And in step S31, it is determined whether or not the content of the reception ID register is an identifier of the communication device B24. If it is determined that the reception ID register is the identifier, the FIFO memory 22 is connected to the communication device B as a transmitting FIFO memory. Thereafter, the processes are ended.

If it is determined that a content of the reception ID register is not the identifier of the communication device B24 in step S31, it is determined whether or not the content of the reception ID register is the identifier of the communication device A23. If it is determined that the content of the reception ID register is the identifier of the communication device A23, the FIFO memory 22 is connected to the communication device A23 as a transmitting FIFO memory. Thereafter, the processes are ended. If it is determined that the content of the reception ID register is not the identifier of the communication device A23, it is determined that some error has occurred so that the processes are immediately ended.

FIG. 9 is a block diagram showing a configuration of an embodiment 4 of the data transferring device of the present invention. In the embodiment 4, differently from the embodiments 1 to 3, the selector 25 is connected also to a communication device C29 in addition to the communication devices A23 and B24, and data received via one communication device and stored in any one of the two FIFO memories is transmitted via any one of the other two communication devices.

In order to realize the above processes, in the embodiment 4, three control signals of FSEL, RSEL and TSEL are provided. The FSEL is a signal in one bit, and each of the two other signals is a signal in two bits.

FIG. 10 is a table for explaining a relationship between the control signal FSEL and the use conditions of FIFO memories. When a value of the FSEL signal is "1", the FIFO memory 21 is used as a transmitting FIFO memory, and the FIFO memory 22 is used as a receiving FIFO memory. And if the value of the FSEL signal is "0", the FIFO memory 21 is used as a receiving FIFO memory and the FIFO memory 22 is used as a transmitting FIFO memory.

FIG. 11 is a table for explaining a control for relationship between the selector 25 and the three communication devices, which control is conducted by the two controlling signals, i.e. RSEL and TSEL. The RSEL signal indicates connection conditions between a selector and communication devices upon the reception of data, and the TSEL signal indicates connection conditions between the selector and communication devices upon the transmission of data. Upon both of reception and transmission, when the values of the above signals are "00", the selector 25 is connected to the communication device A23, and when the values of the above signals are "01", the selector 25 is connected to the communication device B24, and when the values of the above signals are "10", the selector 25 is connected to the communication device C29.

In the embodiment 4, the CPU as a basic constituent of the controlling circuit 27 updates the values of the three control signals (FSEL, RSEL, and TSEL) corresponding to the input values of the two reception completion signals in order to control the connection switching by the selector 25. This is because the connection switching by the selector 25 is executed in correspondence with the current values of the three control signals, i.e. FSEL, RSEL, and TSEL.

Figure 12:
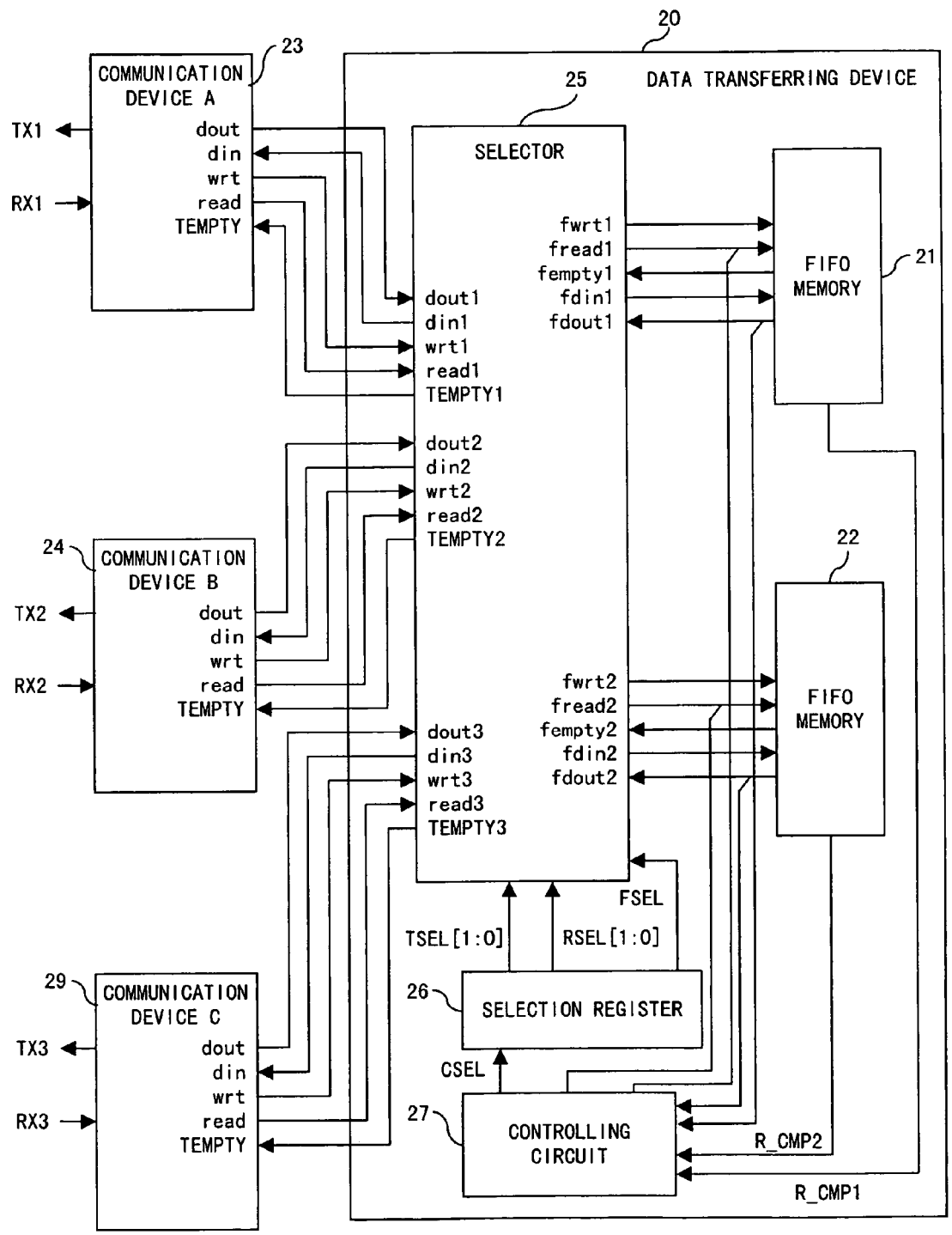
FIG. 12 is a block diagram for showing a configuration of the data transferring device in an embodiment 5.

Finally, as an embodiment 5, a configuration of the controlling circuit including the above described reception ID register is explained with reference to FIGS. 12 and 13. In FIG. 12, fdout 1 and fdout 2 which are signals of data read out of the two FIFO memories are input to the controlling circuit 27 in addition to the reception completion signals from the two FIFO memories 21 and 22. Also, from the controlling circuit 27, signals of fread 1 and fread 2 for the read out of the data from the two FIFO memories 21 and 22 are output to the respective FIFO memories, in addition to the control signal CSEL for the selection register 26.

In FIG. 13, a circuit necessary to make a comparison of the above described reception IDs in the controlling circuit is shown, except for the CPU as a basic constituent. In the controlling circuit 27, a group of registers 32 for storing ID of each communication device in FIG. 12 is provided. And each reception ID in data received and stored in FIFO memories is compared with each of the above IDs stored in the group of register, by the comparing circuit 34.

In FIG. 13, when the reception completion signal R_CMP1 from the FIFO memory 21 is "1", the selector 33 selects data output from the FIFO memory 21, and when the reception completion signal R_CMP1 from the FIFO memory 21 is "0", data output from the FIFO memory 22 is selected.

When the reception completion signal from the FIFO memory 21 becomes "1", the rising of the signal is detected by the rising detecting circuit 31, and a fread1 signal for reading data of the first one byte out of the FIFO memory 21 is output so that the first one-byte data is stored in the reception ID register 30 via the data 33. The stored value of the reception ID is compared with the IDs of respective communication devices stored in a group of registers 32 by a comparing circuit 34. Thereafter, a signal of IDA, IDB, or IDC indicating which ID of the three communication devices A, B, and C corresponds to the comparison result is supplied, as a CSEL signal in three bits in total, to the selection register 26 in FIG. 12.

When the reception completion signal from the FIFO memory 22 becomes "1", the fread2 signal is output from the rising detecting circuit 31 to the FIFO memory 22 in order to read data of the first one byte out of the FIFO memory 22. The read one-byte data is stored in the reception ID register 30 via the selector 33. Then, the R_CMP1 signal is "0" and the selector 33 is in a condition in which the input fdout2 is selected.

Also in the above case, the CSEL signal in three bits as an output of the comparing circuit 34 is supplied to the selection register 26, and is combined with the current values of the three control signals, i.e. FSEL, RSEL and TSEL, which signals are stored in the selection register, so that a control of connection switching of the selector 25 is conducted.

What is claimed is:

1. A device for transferring data by using at least two communication devices, comprising:
   first and second data storing units for individually storing data to be transceived; and
   a connection switching unit,
   upon reception of data via a first communication device from among the at least two communication devices, connecting said first communication device with said first data storing unit,
   after reception of data to be stored in the first data storing unit is completed based upon a byte count received, switching a connection between the first communication device and the first data storing unit so as to connect a second communication device, that is one of the at least two communication devices and different from the first communication device, with the first data storing unit to transfer the data received and stored in the first data storing unit to the second communication device and so as to connect the second communication device with the second data storing unit at a same time to receive data via the second communication device, and
   after reception of data to be stored in the second data storing unit is completed based upon a byte count received, switching a connection between the second communication device and the second data storing unit so as to connect the first communication device with the second data storing unit to transfer the data received and stored in the second data storing unit to the first communication device and so as to connect the first communication device with the first data storing unit at a same time to receive further data via the first communication device.

2. The data transferring device according to claim 1, wherein each data storing unit comprises a First In First Out memory.

3. The data transferring device according to claim 1, further comprising a selection data storing unit for storing selection data for selection of a communication device for transmitting data whose reception is completed, and for supplying said selection data to said connection switching unit.

4. The data transferring device according to claim 3, further comprising a controlling unit for, in correspondence with a data reception completion signal output from a data storing unit, determining a communication device for transmitting said data based on a content of said received data, and for setting data for selection of said communication device for transmitting said data in said selection data storing unit.

5. The data transferring device according to claim 4, wherein:
   each data storing unit comprises a First In First Out memory (FIFO memory);
   an identifier is stored as leading data in said received data, said identifier indicating a communication device to be connected after switching of connections by said connection switching unit; and said controlling unit determines a communication device for transmitting said data in correspondence with said identifier.

6. The data transferring device according to claim 1, comprising a switching prohibiting unit for prohibiting a connection switching regarding a data storing unit and a communication device by said connection switching unit after said reception of data is completed.

7. A device for transferring data by using two communication devices out of a plurality of communication devices, comprising:

a plurality of data storing units each for individually storing data to be transceived; and a connection switching unit, upon reception of data via one communication device out of said plurality of communication devices, connecting said one communication device with any one of said plurality of data storing units, and after receiving data to be stored in a data storing unit is completed based upon a byte count received, switching a connection between the one communication device and the data storing unit so as to connect a different communication device, that is one of the plurality of communication devices and different from the one communication device with the data storing unit to transfer the data received and stored in the data storing unit to the different communication device and so as to connect the different communication device with another data storing unit at a same time to receive data via the different communication device, and after reception of data to be stored in the other data storing unit is completed based upon a byte count received, switching a connection between the different communication device and the other data storing unit so as to connect the one communication device with the other data storing unit to transfer the data received and stored in the other data storing unit to the one communication device and so as to connect the one communication device with the data storing unit at same time to receive further data via the one communication device.

8. The data transferring device according to claim 7, further comprising a controlling unit for detecting a completion of storage of received data in said one of data storing units, and for causing said connection switching unit to conduct connection switching.

\* \* \* \* \*